United States Patent
Islam et al.

(10) Patent No.: US 10,362,512 B2
(45) Date of Patent: *Jul. 23, 2019

(54) METHOD AND APPARATUS FOR SETUP OF A CIRCUIT SWITCHED CALL DURING CIRCUIT SWITCHED FALLBACK

(71) Applicant: BlackBerry Limited, Waterloo (CA)

(72) Inventors: Muhammad Khaledul Islam, Ottawa (CA); Jeffrey William Wirtanen, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/137,108

(22) Filed: Apr. 25, 2016

(65) Prior Publication Data

US 2016/0242079 A1    Aug. 18, 2016

Related U.S. Application Data

(63) Continuation of application No. 14/024,144, filed on Sep. 11, 2013, now Pat. No. 9,326,194.

(51) Int. Cl.
*H04W 36/00* (2009.01)
*H04W 76/16* (2018.01)
(Continued)

(52) U.S. Cl.
CPC ... *H04W 36/0022* (2013.01); *H04W 36/0027* (2013.01); *H04W 76/16* (2018.02); *H04W 88/02* (2013.01); *H04W 88/08* (2013.01)

(58) Field of Classification Search
CPC .......... H04W 36/0022; H04W 36/165
See application file for complete search history.

(56) References Cited

U.S. PATENT DOCUMENTS

2012/0039313 A1    2/2012 Jain
2012/0120789 A1    5/2012 Ramachandran et al.
(Continued)

FOREIGN PATENT DOCUMENTS

| CA | 281944 A1 | 4/2012 |
|---|---|---|
| CA | 2812944 A1 | 4/2012 |
| NO | 2014066767 A1 | 5/2014 |

OTHER PUBLICATIONS

Canadian Intellectual Property Office, Office Action for Application No. 2,923,631, dated Mar. 3, 2017.
(Continued)

*Primary Examiner* — Pao Sinkantarakorn
(74) *Attorney, Agent, or Firm* — Moffat & Co

(57) ABSTRACT

A method, at a user equipment ('UE'), the method: sending a request to a first network for Circuit Switched Fallback ('CSFB'); receiving, responsive to the request, redirection information; acquiring a second network based on the redirection information; initiating establishment of Circuit Switched ('CS') voice radio bearers with the second network; waiting for a predetermined event to occur; after the predetermined event has occurred, establishing a Packet Switched ('PS') connection with the second network. Further, a method, at a network element, the method receiving a request for Circuit Switched Fallback ('CSFB') from a user equipment ('UE'); sending, to the UE, redirection information; receiving a Routing Area Update ('RAU') message from the UE; waiting for a predetermined event to occur; upon the predetermined event occurring, responding to the RAU message.

8 Claims, 8 Drawing Sheets

(51) Int. Cl.
H04W 88/02 (2009.01)
H04W 88/08 (2009.01)

(56) References Cited

U.S. PATENT DOCUMENTS

| | | |
|---|---|---|
| 2013/0142169 A1 | 6/2013 | Kulakov et al. |
| 2013/0265938 A1 | 10/2013 | Jain et al. |
| 2013/0287002 A1 | 10/2013 | Kim et al. |
| 2014/0003364 A1 | 1/2014 | Ramachandran et al. |
| 2014/0177591 A1* | 6/2014 | Dhanda ............... H04W 36/165 |
| | | 370/331 |

OTHER PUBLICATIONS

International Searching Authority, International Search Report on Application No. PCT/CA2014/000554, dated Oct. 16, 2014.
Huawei, "Correction for suspend procedure in CSFB", 3GPP Draft; S2-101061_CR_CORRECTION for Suspend Procedure in CSFB-V1, 3rd Generation Partnership Project (3GPP), Mobile Competence Centre; 650, Route Des Lucioles; F-06921 Sophia-Antipolis Cedex; France, vol. SA WG2, No. San Francisco, USA; 2010022, Feb. 16, 2010.
European Patent Office, Extended European Search Report for Application No. 14843250.3, dated Jan. 10, 2017.
European Patent Office, Office Action (Communication pursuant to Article 94(3) EPC) for Application No. 14 843 250.3-1214, reference P103445EP-WO, dated Mar. 3, 2018.

* cited by examiner

US 10,362,512 B2

METHOD AND APPARATUS FOR SETUP OF A CIRCUIT SWITCHED CALL DURING CIRCUIT SWITCHED FALLBACK

RELATED APPLICATIONS

The present application is a continuation of U.S. Pat. No. 9,326,194, issued Apr. 26, 2016, and filed Sep. 11, 2013, the entire contents of which are incorporated herein by reference.

FIELD OF THE DISCLOSURE

The present disclosure relates to the setup of a circuit-switched call on a mobile communication network and in particular relates to the setup of a circuit switched call during circuit switched fallback (CSFB).

BACKGROUND

The Third Generation Partnership Project (3GPP) defines a long-term evolution (LTE) architecture, which provides high data rate, low latency, packet optimization and improved system capacity and coverage. In an LTE system, an evolved universal terrestrial radio access network (E-UTRAN) includes a plurality of evolved Node-Bs (eNBs) and communicates with a plurality of mobile stations, also referred to as user equipments (UEs).

An LTE network supports only packet-switched (PS) services. However fallback is specified for circuit switched (CS) services as well. CSFB defines a mechanism for using a legacy CS network (e.g. Universal Mobile Telecommunications System Terrestrial Radio Access Network (UTRAN) or a GSM EDGE Radio Access Network (GERAN)) to provide voice and traditional CS-domain services (e.g. voice call, a CS short message service (SMS), Unstructured Supplementary Service Data (USSD), among others).

With CSFB, when there in an incoming CS call for a UE operating in LTE mode, the LTE network pages the device. The device responds with a special service request message to the network, and the network signals the device to move (fall back) to GERAN/UTRAN cell by providing redirection information for the UE to acquire a UTRAN/GERAN cell. Similarly for outgoing CS calls, the same special service request is used to move the device to GERAN/UTRAN to place the outgoing call. The UE then attempts to acquire a GERAN or UTRAN cell based on the received redirection information and then attempts to establish a connection.

The UE then attempts to establish CS service and may attempt to move packet switched services from E-UTRAN to GERAN or UTRAN if applicable. In particular, to maintain data connectivity, an always-on UE is required to perform a Routing Area Update (RAU) procedure to transfer the PS data context from E-UTRAN to UTRAN/GERAN. In addition, there may have been a data session in progress when the CSFB call was initiated, which would trigger the UE to perform an RAU procedure and then initiate a packet data call in parallel with the establishment of the CS call.

The overall call setup time for a CSFB call is significantly longer compared to a CS voice call that is initiated while the UE is already in GERAN/UTRAN. Further, additional delays are caused if PS domain signaling activities take place while the CS domain is being setup.

BRIEF DESCRIPTION OF THE DRAWINGS

The present disclosure will be better understood with reference to the drawings, in which.

DETAILED DESCRIPTION

Figure 1:
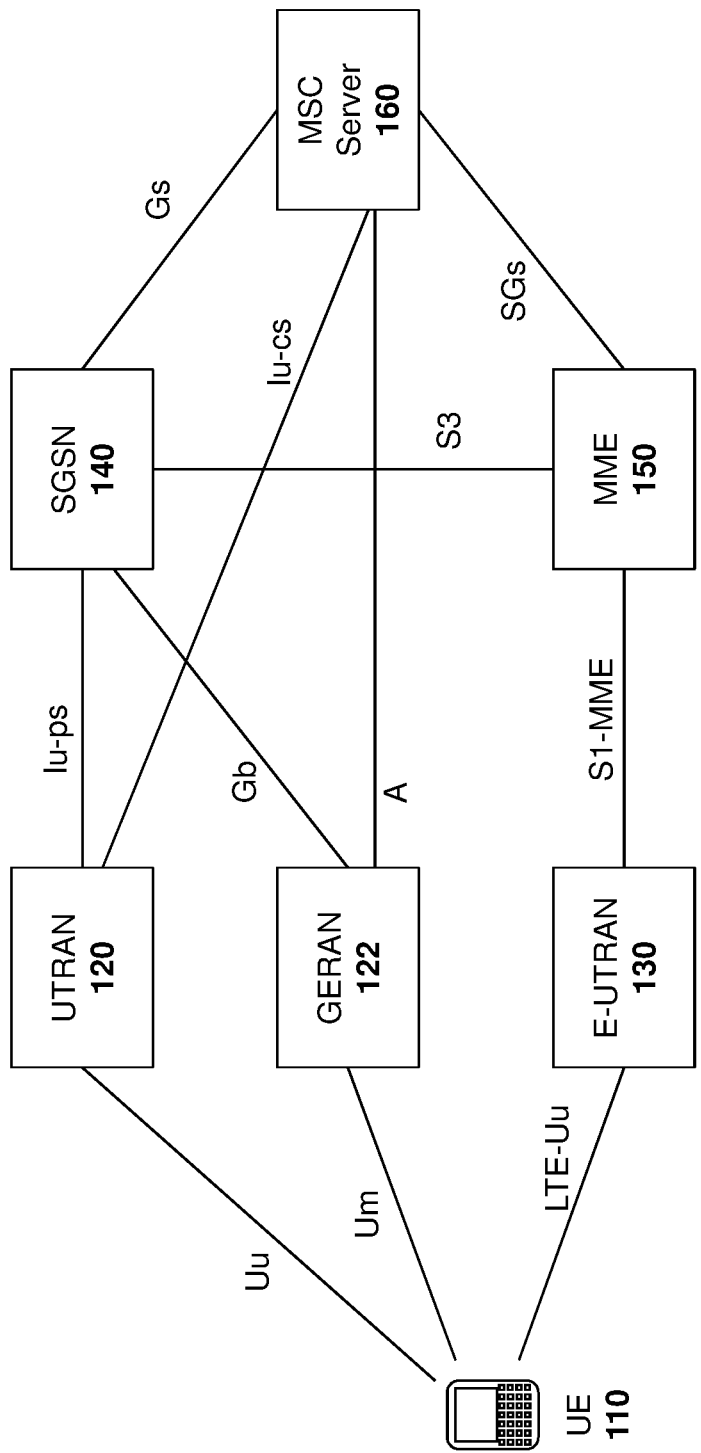
FIG. 1 is a diagram of an example network architecture.

The present disclosure provides a method, at a user equipment ('UE'), comprising: sending a request to a first network for Circuit Switched Fallback ('CSFB'); receiving, responsive to the request, redirection information; acquiring a second network based on the redirection information; initiating establishment of Circuit Switched ('CS') voice radio bearers with the second network; waiting for a predetermined event to occur; after the predetermined event has occurred, establishing a Packet Switched ('PS') connection with the second network.

The present disclosure further provides a user equipment comprising: a processor; a communications subsystem; wherein the user equipment is configured: send a request to a first network for Circuit Switched Fallback ('CSFB'); receive, responsive to the request, redirection information; acquire a second network based on the redirection information; initiate establishment of Circuit Switched ('CS') voice radio bearers with the second network; wait for a predetermined event to occur; after the predetermined event has occurred, establishing a Packet Switched ('PS') connection with the second network.

The present disclosure further provides a method, at a network element, comprising: receiving a request for Circuit Switched Fallback ('CSFB') from a user equipment ('UE'); sending, to the UE, redirection information; receiving a Routing Area Update ('RAU') message from the UE; waiting for a predetermined event to occur; upon the predetermined event occurring, responding to the RAU message.

The present disclosure further provides a network element, comprising: a processor; a communications subsystem; wherein the network element is configured to: receive a request for Circuit Switched Fallback ('CSFB') from a user equipment ('UE'); send, to the UE, redirection information; receive a Routing Area Update ('RAU') message from the UE; wait for a predetermined event to occur; upon the predetermined event occurring, respond to the RAU message.

The overall call setup time for a CSFB call is significantly longer compared to a CS voice call that is initiated while the UE is already camping on GERAN/UTRAN. One major contributor to the increase in call setup time is the acquisition of GERAN/UTRAN, and subsequent synchronization with GERAN/UTRAN which is needed before UE can exchange any signaling message with GERAN/UTRAN.

Further, additional delays may be caused by PS domain signaling activities that happen during the CS domain setup. In addition to the signaling messages that are exchanged to set up CS call, if the UE initiates an RAU procedure, the network in response initiates a PS domain security procedure which prevents or delays the signaling radio bearers to be used for signaling of CS domain activities until the PS domain security procedure is completed.

In addition, the network may also initiate the General Packet Radio Service (GPRS) Mobility Management (GMM) authentication and ciphering process for PS domain which delays the CSFB call setup further.

As a result of all these procedures, the establishment of voice radio bearers for the CS domain is significantly delayed compared to a legacy CS voice call in GERAN/UTRAN. As used herein, the CS voice radio bearers are the radio resources that are setup by the network to transport CS voice over wireless network and can be for either second or third generation networks. The end-to-end call setup delay is particularly long and noticeable by the user if a call is made from one LTE device to another LTE device when both devices are on an LTE network and both undergo the CSFB procedures including PS domain transfer when CS voice call is being setup. This delay in call setup adversely impacts user experience; in addition, such increase in call setup time is highly undesirable if the voice call is an emergency call or an emergency callback call from the Public Safety Answering Point (PSAP).

Circuit switched fallback is provided for in the 3GPP LTE Technical Specification (TS) 23.272, "Third Generation Partnership Project; Technical Specification Group Services and System Aspects; Circuit Switched (CS) Fallback in Evolved Packet System (EPS); Stage 2"; v. 11.5.0, June 2013, the contents of which are incorporated herein by reference. CSFB can be used to fall back to either second generation GERAN networks or third generation UTRAN networks. In particular the system architecture is provided in FIGS. 4.2-1 of the 3GPP TS 23.272 specification and is reproduced herein with regard to FIG. 1.

Reference is now made to FIG. 1, which illustrates one embodiment of a mobile communication system that includes a GERAN/UTRAN network, as well as an LTE network.

In particular, a UE 110 is a multi-mode UE capable of communicating with both an LTE network as well as a GERAN/UTRAN network. As seen in FIG. 1, UE 110 communicates with either or both of a UTRAN 120 or a GERAN 122 for circuit switched services. UE 110 further communicates with an E-UTRAN 130 for the LTE network.

Both UTRAN 120 and GERAN 122 communicate with a serving general packet radio service (GPRS) support node (SGSN) 140 for packet switched services and with MSC server 160 for circuit switched services.

The E-UTRAN communicates with mobility management entity (MME) 150.

In the CSFB system, mobile switching center (MSC) server 160 further communicates with MME 150.

During normal operation, UE 110 will camp on the LTE system. If a mobile terminated call is received then MSC server 160 will notify MME 150, which will then send a page to UE 110 through E-UTRAN 130 to transition to UTRAN 120 or GERAN 122. The UE 110 will then transition for the duration of the circuit switched call. At the end of the circuit switch call the UE then transitions back to the LTE network.

Packet switched services may either be suspended for the duration of the circuit switched call or may be transferred to SGSN 140, where the UE 110 will continue to receive packet data, although at a lower speed than from the LTE network.

For a mobile originated call, the UE 110 may transition to UTRAN 120 or GERAN 122 for the duration of the call.

Typical non-access stratum/radio resource control (NAS/RRC) signaling for a mobile-terminated CS voice call setup between a UE camped on a UTRAN cell and a UMTS network is shown with regards to Table 1 below. The messages shown in italics are optional messages that UMTS network may initiative for authentication purposes.

TABLE 1

CS Voice Call for UE camped on UTRAN Cell

| UE | ← Network | Paging |
|---|---|---|
| UE | → Network | rrcConnectionRequest (terminatingConversationalCall) |
| UE | ← Network | rrcConnectionSetup |
| UE | → Network | rrcConnectionSetupComplete |
| UE | → Network | initialDirectTransfer (NAS RR PAGING_RESPONSE) |
| UE | ← Network | *downlinkDirectTransfer (NAS MM AUTHENTICATION_REQUEST)* |
| UE | → Network | *uplinkDirectTransfer (AUTHENTICATION_RESPONSE)* |
| UE | ← Network | securityModeCommand (CS domain) |
| UE | → Network | securityModeComplete |
| UE | ← Network | downlinkDirectTransfer (NAS MM IDENTITY_REQUEST) |
| UE | → Network | uplinkDirectTransfer (NAS MM IDENTITY_RESPONSE) |
| UE | ← Network | downlinkDirectTransfer (NAS CC SETUP) |
| UE | → Network | uplinkDirectTransfer (NAS CC CALL_CONFIRMED) |
| UE | ← Network | radioBearerSetup (CS domain RAB) |
| UE | → Network | radioBearerSetupComplete |
| UE | → Network | uplinkDirectTransfer (NAS CC ALERT) |

Conversely, Table 2 shows the NAS/RRC signaling during a mobile-terminated CS voice call setup, between a UE initially connected to an LTE network and the networks comprising the LTE network that receives CS voice call request and the UMTS network that handles the CS voice call. The bold messages are for the PS domain. In this example, the UE fallbacks to UTRAN for CS voice call. Fallback to GERAN comprises similar steps.

TABLE 2

| LTE to CSFB Voice Call |
|---|
| LTE to UMTS CSFB Voice Call |

| UE | ← Network | Paging |
|---|---|---|
| UE | → Network | EPS MM Extended service request (MT CSFB) |
| UE | → Network | rrcConnection Request (mt-Access) |
| UE | ← Network | rrcConnectionSetup |
| UE | → Network | rrcConnectionSetupComplete |
| UE | ← Network | securityModeCommand |

TABLE 2-continued

LTE to CSFB Voice Call

| | | |
|---|---|---|
| UE → Network | securityModeCommandComplete | |
| UE ← Network | ueCapabilityEnquiry | |
| UE → Network | ueCapabilityInformation | |
| UE ← Network | rrcConnectionReconfiguration | |
| UE → Network | rrcConnectionReconfigurationComplete | |
| UE ← Network | rrcConnectionRelease (redirectedCarrierInfo utra-FDD) | |
| | UE acquires a UTRAN cell | |
| UE → Network | rrcConnectionRequest (terminatingConversationalCall) | |
| UE ← Network | rrcConnectionSetup | |
| UE → Network | rrcConnectionSetupComplete | |
| UE → Network | initialDirectTransfer (NAS RR PAGING_RESPONSE) | |
| UE → Network | initialDirectTransfer (GMM_ROUTING_AREA_UPDATE_REQUEST) | |
| UE ← Network | downlinkDirectTransfer (NAS MM AUTHENTICATION_REQUEST) | |
| UE ← Network | downlinkDirectTransfer (GMM_AUTHENTICATION_AND_CYPHERING_REQUEST) | |
| UE → Network | uplinkDirectTransfer (AUTHENTICATION_RESPONSE) | |
| UE → Network | uplinkDirectTransfer (GMM_AUTHENTICATION_AND_CYPHERING_RESPONSE) | |
| UE ← Network | securityModeCommand (CS domain) | |
| UE → Network | securityModeComplete | |
| UE ← Network | securityModeCommand (PS domain) | |
| UE → Network | securityModeComplete | |
| UE ← Network | downlinkDirectTransfer (GMM_ROUTING_AREA_UPDATE_ACCEPT) | |
| UE → Network | uplinkDirectTransfer (ROUTING_AREA_UPDATE_COMPLETE) | |
| UE ← Network | downlinkDirectTransfer (NAS MM IDENTITY_REQUEST) | |
| UE → Network | uplinkDirectTransfer (NAS MM IDENTITY_RESPONSE) | |
| UE ← Network | downlinkDirectTransfer (NAS GMM GMM_INFORMATION) | |
| UE ← Network | downlinkDirectTransfer (NAS CC SETUP) | |
| UE → Network | uplinkDirectTransfer (NAS CC CALL_CONFIRMED) | |
| UE ← Network | signallingConnectionRelease (PS domain) | |
| UE ← Network | radioBearerSetup (CS domain RAB) | |
| UE → Network | radioBearerSetupComplete | |
| UE → Network | uplinkDirectTransfer (NAS CC ALERT) | |

As seen in Table 2 above, the UE is connected to the LTE network prior to acquiring the UTRAN cell, after which the UE is connected to the UMTS network.

Since the UE must first acquire the UTRAN cell, CS call setup with CSFB has more latency. For example, one set of real world test results, where the tests were performed on live-air commercial networks to compare the call setup latency of a CSFB call compared to a CS voice call, are shown with regards to Table 3 below. The tests were performed simultaneously so that any loading or other artifacts of the network affected each call in a similar manner. The results in Table 3 are merely examples, but show the call setup time for CSFB calls is significantly longer than for regular CS voice calls.

TABLE 3

Comparison between Call Setup Latencies

| | | | Median Call Setup Time (ms) | | |
|---|---|---|---|---|---|
| | | | | Breakdown of Total | |
| Source to Destination Type | Network | Type of Call | Total | LTE Ext Service Request to UMTS RRC Connection Request (LTE→UMTS) | UMTS RRC Connection Request to UMTS Radio Bearer Setup for CS domain messages |
| Land to Mobile Call | Network 1 | Legacy CS voice call in UTRAN | 1268.5 | N/A | 1268.5 |
| | | CSFB LTE to UTRAN | 2528 | 1002 | 1526 |
| | Network 2, location 1 | Legacy CS voice call in UTRAN | 1545 | N/A | 1545 |

TABLE 3-continued

Comparison between Call Setup Latencies

Median Call Setup Time (ms)

Breakdown of Total

| Source to Destination Type | Network | Type of Call | Total | LTE Ext Service Request to UMTS RRC Connection Request (LTE→UMTS) | UMTS RRC Connection Request to UMTS Radio Bearer Setup for CS domain messages |
|---|---|---|---|---|---|
| | | CSFB LTE to UTRAN | 3406.5 | 988.5 | 2418 |
| | Network 2, location 2 | Legacy CS voice call in UTRAN | 1691.5 | N/A | 1691.5 |
| | | CSFB LTE to UTRAN | 3541 | 816 | 2725 |
| Mobile to Mobile Call | Network 2, location 2 | Legacy CS voice call in UTRAN | 3749 | N/A | 3749 |
| | | CSFB LTE to UTRAN | 6770 | 920 | 5850 |

Accordingly, the embodiments described below provide solutions to reduce the CSFB call setup delay. Specifically, embodiments of the present disclosure provide for the reduction in the CSFB delay by delaying PS domain signaling activities until after the voice radio bearer for the CS domain is established.

According to at least one embodiment, the PS domain signaling activities are suspended until the CS domain voice radio bearer for the voice call is setup. According to at least one further embodiment, the PS domain signaling activities are delayed for a certain duration.

According to at least one embodiment, these solutions may be triggered on the mobile device, regardless of whether there is an ongoing active PS data session in LTE at the time of the CSFB call. In an at least another embodiment, these solutions may be triggered only when there is no active PS data session in LTE or pending PS data session or request in UMTS for a PS data session. At the time of CSFB call in LTE, the Non Access Stratum (NAS) layer on the UE can implicitly determine that the UE has no active PS data session if the Evolved Packet System Mobility Management (EMM) entity is in idle mode (EMM-IDLE mode). The NAS layer on the UE may also check the status of a follow-on bit in an RAU request to check if there is any pending data or not.

Notably, the above solutions may delay the transfer of the PS data context from LTE to UTRAN by a small margin but reduce the latency for CS voice call setup which is more important from users' perspective.

Figure 2:
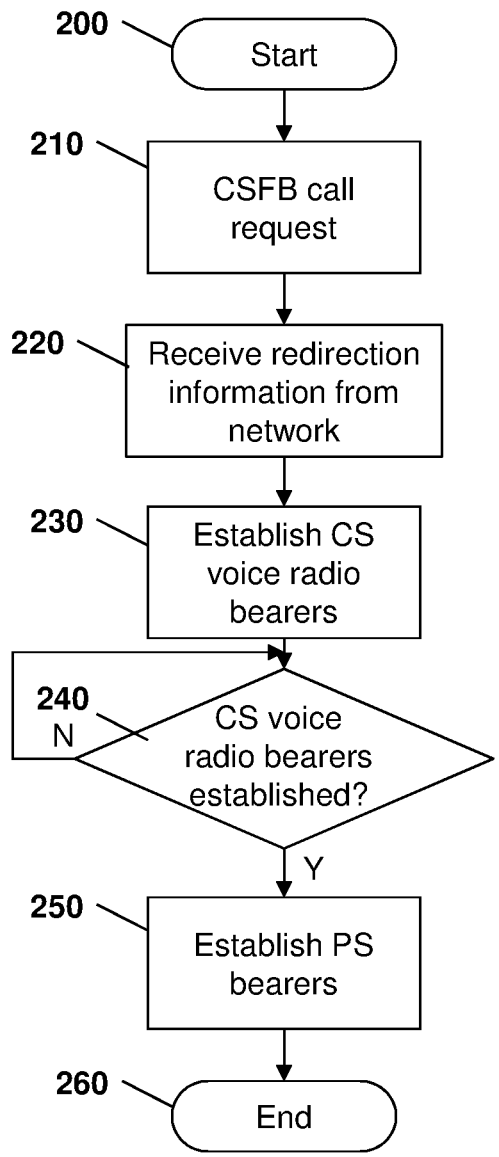
FIG. 2 is a flow chart of a process according to at least one embodiment of the present disclosure.

Reference is now made to FIG. 2, which provides a flow chart of a method according to at least one embodiment of the present disclosure.

The method of FIG. 2 starts at block 200, and proceeds to block 210 in which a CSFB call request is sent from the UE to the LTE network. For example, the request may be based on a page from the network for a mobile terminated call, as seen in Table 2 above, or may be for a mobile originated call.

The process next proceeds to block 220, in which the UE receives redirection information from the network in response to the CSFB call request. For example, from Table 2 above, the redirection information may be in the form of a rrcConnection Release (redirectedCarrierinfo utra-FDD) message.

Based on the received redirection information, the UE attempts to acquire and then connect to a UTRAN cell to establish circuit switched service, as shown at block 230.

The UE then waits until the circuit switched voice radio bearers are established, and checks that the circuit switched voice radio bearers are established at block 240. Once the circuit switched voice radio bearers are established, the process proceeds block 250 in which UE initiates the procedure to transfer the PS domain to UTRAN by sending the GMM_ROUTING_AREA_UPDATE_REQUEST to the UTRAN.

The process then proceeds to block 260 and ends.

Table 4 below shows example signaling for a mobile-terminated voice call between a UE and a network when the above solution is implemented.

TABLE 4

LET to UMTS CSFB Voice Call (modified)

LTE to UMTS CSFB Voice Call

| | | |
|---|---|---|
| UE ← Network | | Paging |
| UE → Network | | EPS MM Extended service request (MT CSFB) |
| UE → Network | | rrcConnectionRequest (mt-Access) |
| UE ← Network | | rrcConnectionSetup |
| UE → Network | | rrcConnectionSetupComplete |
| UE ← Network | | securityModeCommand |

TABLE 4-continued

LET to UMTS CSFB Voice Call (modified)

| | | |
|---|---|---|
| UE | → Network | securityModeCommandComplete |
| UE | ← Network | ueCapabilityEnquiry |
| UE | → Network | ueCapabilityInformation |
| UE | ← Network | rrcConnectionReconfiguration |
| UE | → Network | rrcConnectionReconfigurationComplete |
| UE | ← Network | rrcConnectionRelease (redirectedCarrierInfo utra-FDD) |
| | | UE acquires a UTRAN cell |
| UE | → Network | rrcConnectionRequest (terminatingConversationalCall) |
| UE | ← Network | rrcConnectionSetup |
| UE | → Network | rrcConnectionSetupComplete |
| UE | → Network | initialDirectTransfer (NAS RR PAGING_RESPONSE) |
| *UE* | *← Network* | *downlinkDirectTransfer (NAS MM AUTHENTICATION_REQUEST)* |
| *UE* | *→ Network* | *uplinkDirectTransfer (AUTHENTICATION_RESPONSE)* |
| UE | ← Network | securityModeCommand (CS domain) |
| UE | → Network | securityModeComplete |
| UE | ← Network | downlinkDirectTransfer (NAS MM IDENTITY_REQUEST) |
| UE | → Network | uplinkDirectTransfer (NAS MM IDENTITY_RESPONSE) |
| UE | ← Network | downlinkDirectTransfer (NAS CC SETUP) |
| UE | → Network | uplinkDirectTransfer (NAS CC CALL_CONFIRMED) |
| UE | ← Network | radioBearerSetup (CS domain RAB) |
| UE | → Network | radioBearerSetupComplete |
| UE | → Network | initialDirectTransfer (GMM_ROUTING_AREA_UPDATE_REQUEST) |
| UE | → Network | uplinkDirectTransfer (NAS CC ALERT) |
| UE | ← Network | radioBearerReconfiguration |
| UE | → Network | radioBearerReconfigurationComplete |
| *UE* | *← Network* | *downlinkDirectTransfer (GMM_AUTHENTICATION_AND_CYPHERING_REQUEST)* |
| *UE* | *→ Network* | *uplinkDirectTransfer (GMM_AUTHENTICATION_AND_CYPHERING_RESPONSE)* |
| UE | ← Network | securityModeCommand (PS domain) |
| UE | → Network | securityModeComplete |
| UE | ← Network | downlinkDirectTransfer (GMM_ROUTING_AREA_UPDATE_ACCEPT) |
| UE | → Network | uplinkDirectTransfer (ROUTING_AREA_UPDATE_COMPLETE) |
| UE | ← Network | downlinkDirectTransfer (NAS GMM GMM_INFORMATION) |
| UE | ← Network | signallingConnectionRelease (PS domain) |

As seen in Table 4 above, the PS establishment does not start until after the UE sends a radioBearerSetupComplete message for the CS domain RAB to the network.

Figure 3:
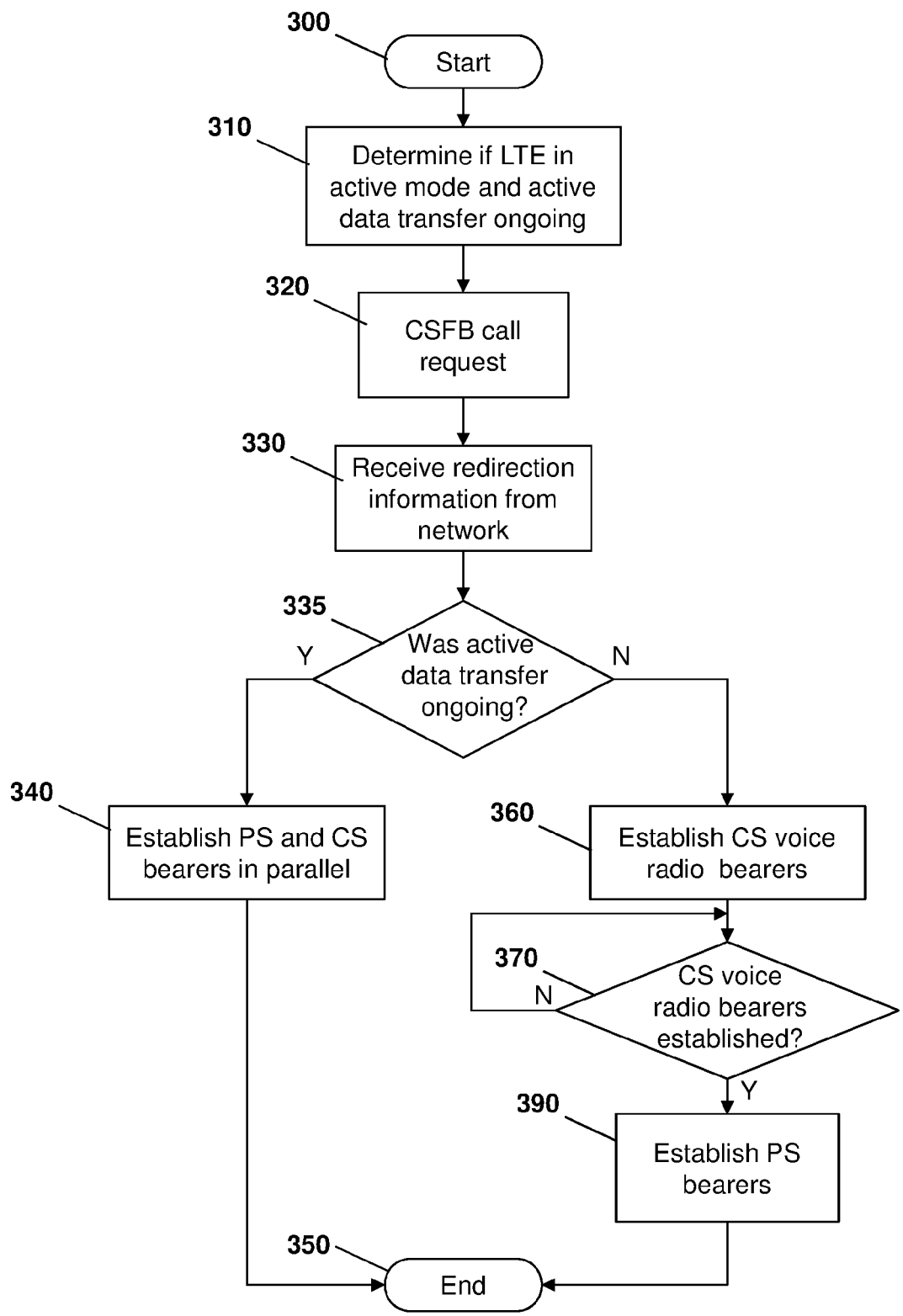
FIG. 3 is a flow chart of a process according to a further embodiment of the present disclosure.

Another embodiment of the present disclosure is illustrated with respect to FIG. 3. In particular, in order not to increase PS bearer establishment during a CSFB call when there is an ongoing active PS data session on LTE network, a check may be made to determine whether to perform the CS voice radio bearer establishment in parallel with the PS bearer establishment, or whether the CS voice radio bearer establishment may occur first.

In particular, the method of FIG. 3 starts at block 300 and proceeds to block 310 in which the UE determines whether a PS data session is ongoing. In at least one embodiment, the UE also determines whether there are pending requests for a PS data session. In other embodiments, the determination at block 310 may simply be that the UE is in LTE active. Other examples are possible.

From block 310 the process proceeds to block 320 in which the UE then requests a CSFB call from the network. As with the embodiment of FIG. 2, the request may be based on a page for a mobile terminated call or may be based on a mobile originated call.

The process then proceeds to block 330, in which the UE receives redirection information from the network in response to the request for a CSFB call.

The process then proceeds to block 335 in which a check is made whether a PS data session was ongoing or if there were pending requests for a PS data session, as determined at block 310. If there was an ongoing PS data session, or if there was a pending request for a PS data session, the process proceeds from block 335 to block 340 where circuit and packet switched bearers are established in parallel, for example using signaling similar to that of Table 2 above. The process then proceeds to block 350 and ends.

Conversely, from block 335, if there was no PS data session, or if there was no pending request for a PS data session, the method proceeds to block 360 to establish the CS voice radio bearers, and then to block 370 to wait until it is determined that the circuit switched bearers are established. Once the circuit switched voice radio bearers are established, the process proceeds to block 380 in which the packet switched bearers are established. From block 380 the process proceeds to block 350 and ends. The process of block 360 and 380 may, for example, use the signaling of Table 4 above.

In at least some embodiments, the process of block 310, namely determining whether a PS data session is ongoing, could be performed at block 330 instead.

In a further embodiment, rather than wait and check for CS voice radio bearers being (or in addition to this process), a delay may be introduced after CS voice radio bearer establishment is initiated. The further embodiment is illustrated with respect to FIG. 4.

Figure 4:
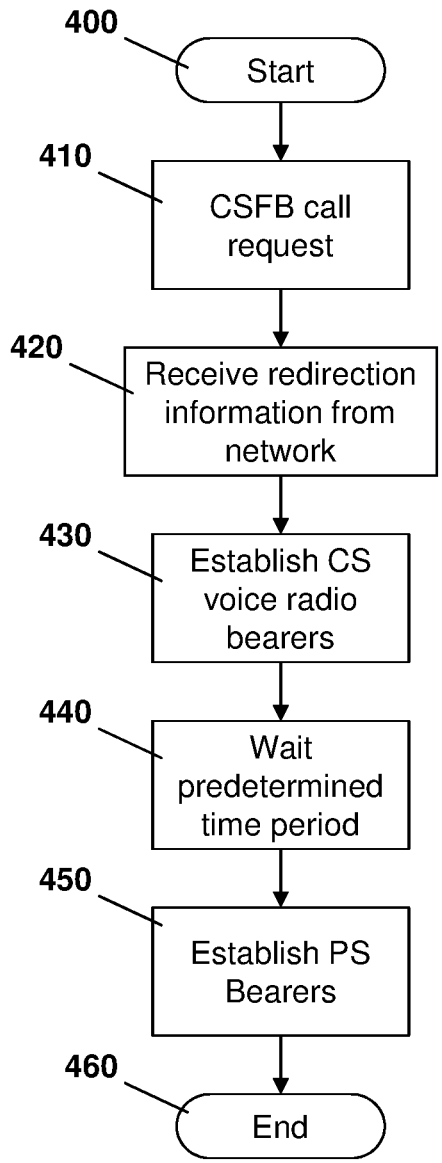
FIG. 4 is a flow chart of a process according to a further embodiment of the present disclosure.

The process of FIG. 4 starts at block 400 and proceeds to block 410 in which the UE makes a CSFB call request to the network. As indicated above for the embodiments of FIGS. 2 and 3, the request may be made based on the receipt of a page for a mobile terminated call or based on a mobile originated call. From Tables 2 and 4, the mobile terminated version of the signaling may be a EPS MM Extended service request (MT CSFB) message.

From block 410 the process proceeds to block 420, in which the UE receives redirection information from the network in response to the request for a CSFB call. For example, from Table 4 the redirection information may be in the form of message rrcConnection Release (redirectedCarrierinfo utra-FDD).

The process then proceeds to block 430, in which the UE acquires the UTRAN cell and establishes circuit switched voice radio bearers. Such CS voice radio bearer establishment may be in the form of a radioBearerSetup (CS domain RAB) message.

The process then proceeds to block 440, where the UE waits a predetermined amount of time. The predetermined amount of time maybe preset, for example at the time the UE is manufactured or by a carrier when a device is deployed, or may be configured by the network, or by other means known in the art. The timer for the predetermined wait time is reset if the CS voice radio bearer is established prior to its expiry.

After the predetermined amount of time has elapsed, the process proceeds to block 450, in which the procedure to transfer PS domain is initiated, for example, using the GMM_ROUTING_AREA_UPDATE_REQUEST. From block 450 the process proceeds to block 460 and ends.

In some cases, the processes of FIG. 3 and FIG. 4 may be combined. Specifically, if a PS data session is ongoing, or if there is a pending request for a PS data session at the time of the CSFB call, the UE may skip waiting for a predetermined amount of time and proceed immediately to establishing packet switched bearers.

Furthermore, the predetermined amount of time could be set to a length which is longer than the expected time required for establishing circuit switched voice radio bearers. Specifically, if for some reason the UE is unable to establish circuit switched voice radio bearers and the UE is prevented from establishing packet switched bearers until the circuit switched voice radio bearers are established, the UE may become inoperable. Accordingly, in some embodiments, the method waits for the first one of the establishment of circuit switched voice radio bearers or the expiration of a predetermined time period to establish packet switched bearers. In a further embodiment, the predetermined time period is longer than an expected or an average time required to establish circuit switched voice radio bearers.

Figure 5:
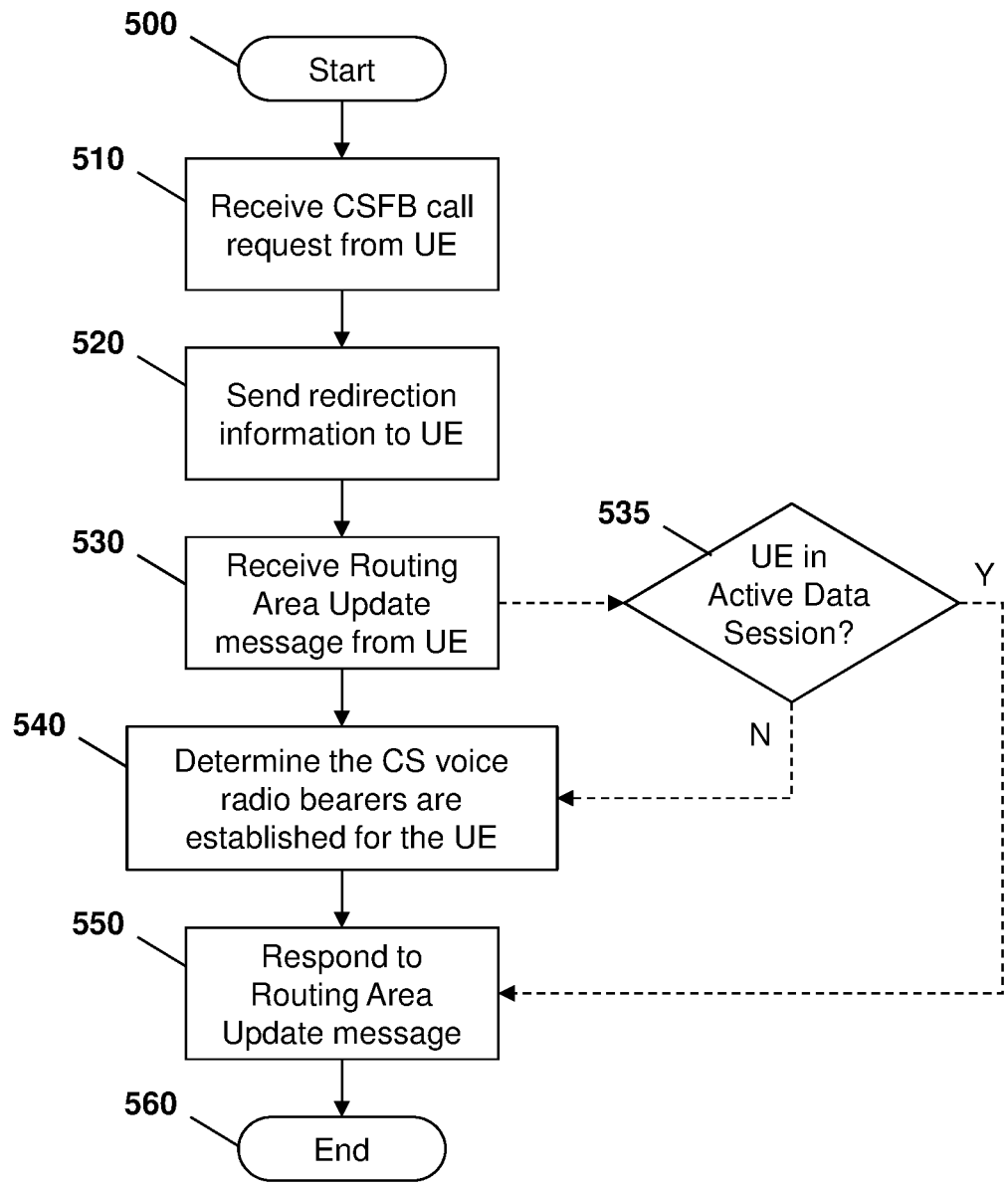
FIG. 5 is a flow chart of a process at a network side according a further embodiment of the present disclosure.

In a further embodiment, the delaying procedure is performed on the network side instead of on the UE side. Reference is now made to FIG. 5.

The process of FIG. 5 starts at block 500 and proceeds to block 510 in which the network element receives a CSFB call request from the UE.

The process then proceeds to block 520 in which the network element responds to the CSFB request with redirection information. From Table 4, the response may be a redirectedCarrierinfo utra-FDD message.

The process then proceeds to block 530, where the network element receives a Routing Area Update message from the UE. In at least some embodiments, the network element examines the follow-on bit in the Routing Area Update message to determine whether the UE is in an active PS data session or a PS data session is about to start.

If the network element determines that the UE is in an active data session, as shown by block 535, the network element may proceed directly from block 530 to block 550 and respond to the Routing Area Update message, after which the method ends at block 560.

Otherwise, if the network element determines that the UE is not in an active data session, or if the network element does not perform the check of block 535, the network element waits until the UE has established its circuit switched voice radio bearers as shown at block 540.

Once the network element determines that the UE has established circuit switched voice radio bearers, the network element may respond to the Routing Area Update message at block 550, after which the process ends at block 560.

Therefore, the above embodiments provide for the delay, at least in some cases, of the establishment of PS radio bearers to reduce the call setup latency of a CFSB call.

Practical results demonstrate a relative improvement for CSFB voice call setup times, attributed to the above embodiments, shown in Table 5 below. Table 5 further shows the increase in the time required to transfer the PS domain.

TABLE 5

Example Call Setup Time Comparison

| Source to Destination Type | Network | Type of Call | LTE Ext Service Request to UMTS RRC Connection Request (LTE→UMTS) | UMTS RRC Connection Request to UMTS Radio Bearer Setup for CS domain messages | Median time of PS data session transfer (ms) UMTS RRC Connection Request → RAU Accept message |
|---|---|---|---|---|---|
| Land to Mobile Call | Network 1 | Legacy CS | N/A | 1268.5 | N/A |
| | | CSFB | 1000 | 1526 | |
| | | CSFB (modified) | 929 | 1396 | |
| | Network 2 | Legacy CS | N/A | 1545 | N/A |
| | | CSFB | 988.5 | 2418 | 2346 |
| | | CSFB (modified) | 1071.5 | 1720 | 3694 |
| | Network 3 | Legacy CS | N/A | 1691.5 | N/A |
| | | CSFB | 1080 | 2661 | 1986 |
| | | CSFB (modified) | 860 | 1746 | 3815.5 |
| Mobile to Mobile Call | Network 3 | Legacy CS | N/A | 3749 | N/A |
| | | CSFB | 920 | 5850 | 2296 |
| | | CSFB (modified) | 954 | 4296 | 6357.5 |

In Table 5, a "legacy CS" is a call originated on a UTRAN cell. The "CSFB" is the time using existing CSFB procedures and "CSFB (modified)" uses the embodiment of FIG. 2 above. From the table the modified CSFB procedure of FIG. 2 provides a reduction in the call setup time.

Figure 6:
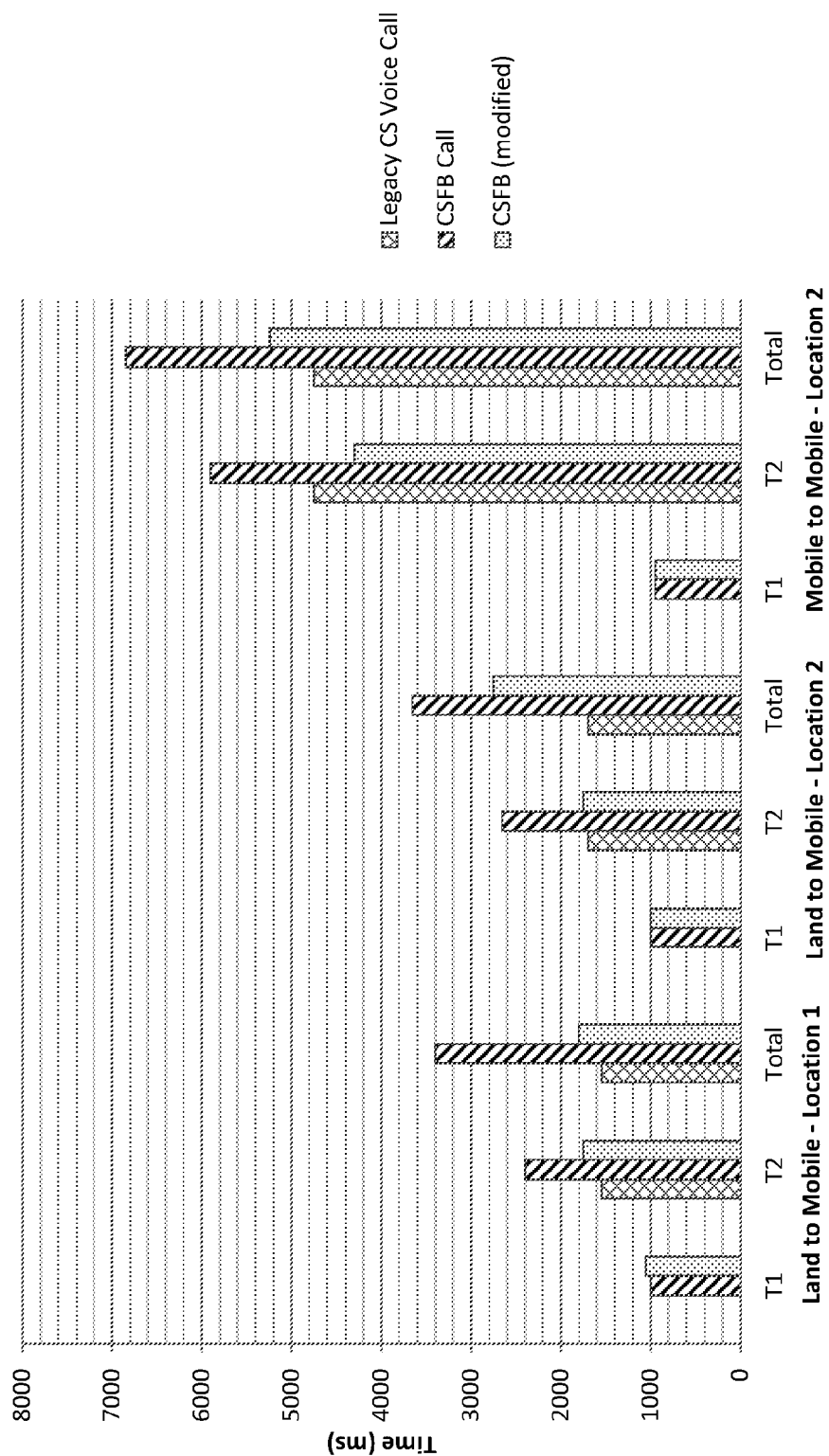
FIG. 6 is a bar chart of the observed call setup times of legacy CS calls, CSFB prior art calls and CSFB calls in accordance with at least one embodiment of the present disclosure.

Further results are illustrated in FIG. 6, which compares the time required to establish a legacy CS voice call, a prior art CSFB voice call, and a CSFB voice call in accordance with the present disclosure. The label T1 stands for the time interval between the CSFB request from the UE when the UE is on an LTE network and the UMTS RRC Connection Request after the UE has acquired a UMTS network. The label T2 stands for the time interval between the UMTS RRC Connection Request and the UMTS CS voice radio bearer setup. The label Total stands for the total of T1 and T2.

The above embodiments may be implemented by any UE. One exemplary device is described below with regard to FIG. 7.

UE 700 is typically a two-way wireless communication device having voice and/or data communication capabilities. UE 700 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 700 is enabled for two-way communication, it may incorporate a communication subsystem 711, including both a receiver 712 and a transmitter 714, as well as associated components such as one or more antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate. The radio frequency front end of communication subsystem 711 can be for any of the embodiments described above.

Network access requirements will also vary depending upon the type of network 719. In some networks network access is associated with a subscriber or user of UE 700. A UE may require a removable user identity module (RUIM) or a subscriber identity module (SIM) or a universal subscriber identity module (USIM) in order to operate on a network. The SIM/USIM/RUIM interface 744 is normally similar to a card-slot into which a SIM/RUIM card can be inserted and ejected. The SIM/USIM/RUIM card can have memory and hold many key configurations 751, and other information 753 such as identification, and subscriber related information.

Figure 7:
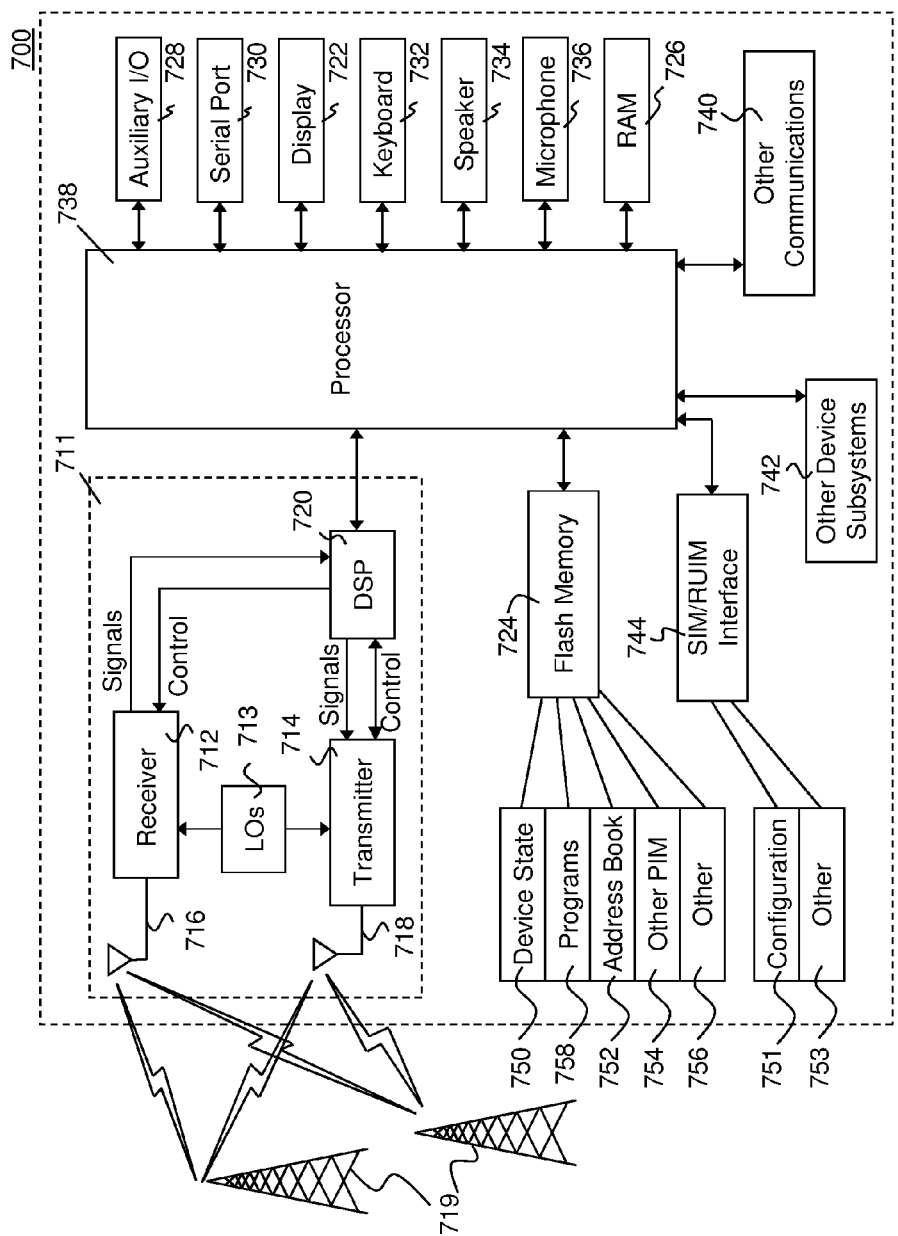
FIG. 7 is a block diagram of an example user equipment.

When required network registration or activation procedures have been completed, UE 700 may send and receive communication signals over the network 719. As illustrated in FIG. 7, network 719 can consist of multiple base stations communicating with the UE. Further, as described above, a multi-mode UE may communicate with base stations of different networks 719, for example a WCDMA and an LTE network.

Signals received by antenna 716 through communication network 719 are input to receiver 712, which may perform such common receiver functions as signal amplification, frequency down conversion, filtering, channel selection and the like. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

UE 700 generally includes a processor 738 which controls the overall operation of the device. Communication functions, including data and voice communications, are performed through communication subsystem 711. Processor 738 also interacts with further device subsystems such as the display 722, flash memory 724, random access memory (RAM) 726, auxiliary input/output (I/O) subsystems 728, serial port 730, one or more keyboards or keypads 732, speaker 734, microphone 736, other communication subsystem 740 such as a short-range communications subsystem and any other device subsystems generally designated as 742. Serial port 730 could include a USB port or other port known to those in the art.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the processor 738 may be stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Processor 738, in addition to its operating system functions, may enable execution of software applications on the UE. A predetermined set of applications that control basic operations, including at least data and voice communication applications for example, will normally be installed on UE 700 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 719. Further applications may also be loaded onto the UE 700 through the network 719, an auxiliary I/O subsystem 728, serial port 730, short-range communications subsystem 740 or any other suitable subsystem 742, and installed by a user in the RAM 726 or a non-volatile store (not shown) for execution by the processor 738. Such flexibility in application installation increases the functionality of the device and may provide enhanced on-device functions, communication-related functions, or both. For example, secure communication applications may enable electronic commerce functions and other such financial transactions to be performed using the UE 700.

In a data communication mode, a received signal such as a text message or web page download will be processed by the communication subsystem 711 and input to the processor 738, which may further process the received signal for output to the display 722, or alternatively to an auxiliary I/O device 728.

A user of UE 700 may also compose data items such as email messages for example, using the keyboard 732, which may be a complete alphanumeric keyboard or telephone-type keypad, or a virtual keyboard, among others, in conjunction with the display 722 and possibly an auxiliary I/O device 728. Such composed items may then be transmitted over a communication network through the communication subsystem 711.

For voice communications, overall operation of UE 700 is similar, except that received signals would typically be output to a speaker 734 and signals for transmission would be generated by a microphone 736. Alternative voice or audio I/O subsystems, such as a voice message recording subsystem, may also be implemented on UE 700. Although voice or audio signal output is generally accomplished primarily through the speaker 734, display 722 may also be used to provide an indication of the identity of a calling party, the duration of a voice call, or other voice call related information for example.

Serial port 730 in FIG. 7 may be implemented in a personal digital assistant (PDA)-type UE for which synchronization with a user's desktop computer (not shown) may be desirable, but is an optional device component. Such a port 730 would enable a user to set preferences through an external device or software application and would extend the capabilities of UE 700 by providing for information or software downloads to UE 700 other than through a wireless communication network. The alternate download path may for example be used to load an encryption key onto the device through a direct and thus reliable and trusted connection to thereby enable secure device communication. As will be appreciated by those skilled in the art, serial port 730 can further be used to connect the UE to a computer to act as a modem or for charging purposes.

Other communications subsystems 740, such as a short-range communications subsystem, is a further optional component which may provide for communication between UE 700 and different systems or devices, which need not necessarily be similar devices. For example, the subsystem 740 may include an infrared device and associated circuits and components or a Bluetooth™ communication module to provide for communication with similarly enabled systems and devices. Subsystem 740 may further include non-cellular communications such as WiFi or WiMAX, or near field communications (NFC).

Figure 8:
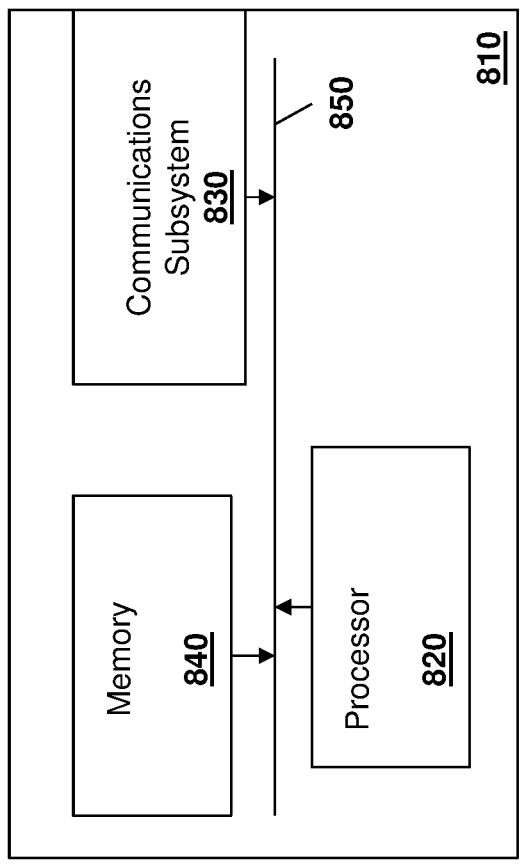
FIG. 8 is a block diagram of an example simplified network element.

Further, the network elements in the embodiments above can be any network element, or part of any network element, including various network servers. Reference is now made to FIG. 8, which shows a generalized network element.

In FIG. 8, network element 810 includes a processor 820 and a communications subsystem 830, where the processor 820 and communications subsystem 830 cooperate to perform the methods of the embodiments described above.

Processor 820 is configured to execute programmable logic, which may be stored, along with data, on network element 810, and shown in the example of FIG. 8 as memory 840. Memory 840 can be any tangible storage medium.

Alternatively, or in addition to memory 840, network element 810 may access data or programmable logic from an external storage medium, for example through communications subsystem 830.

Communications subsystem 830 allows network element 810 to communicate with other network elements or to UEs.

Communications between the various elements of network element 810 may be through an internal bus 850 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method, at a user equipment ('UE'), comprising:
sending a request to a first network for Circuit Switched Fallback ('CSFB') while connected to the first network;
receiving, responsive to the request, redirection information to a second network;
initiating the establishment of radio bearers for a circuit switched (CS) connection with the second network based on the redirection information;
starting a timer;
waiting for a first of the CS voice radio bearers being established and the expiration of the timer;
initiating Packet Switched ('PS') signaling with the second network in response to the first of the CS voice radio bearers being established and the expiration of the timer;
wherein an initial value of the timer is configured based on a message from one of the first network and the second network; and
wherein CS voice radio bearers are determined to be established when the UE sends a radioBearerSetupComplete message for the CS domain.

2. The method of claim 1, wherein the UE waits for a predetermined event to occur before said initiating if the UE does not have a pending data session request on the second network.

3. The method of claim 1, wherein the UE waits for a predetermined event to occur before said initiating if the UE does not have a pending data transmission on the second network.

4. A user equipment comprising:
a processor;
a communications subsystem;
wherein the processor and communications subsystem cooperate to:
send a request to a first network for Circuit Switched Fallback ('CSFB') while connected to the first network;

receive, responsive to the request, redirection information to a second network;

initiate the establishment of radio bearers for a circuit switched (CS) connection with the second network based on the redirection information;

start a timer;

wait for a first of the CS voice radio bearers being established and the expiration of the timer;

initiate Packet Switched ('PS') signaling with the second network in response to the first of the CS voice radio bearers being established and the expiration of the timer;

wherein an initial value of the timer is configured based on a message from one of the first network and the second network; and wherein CS voice radio bearers are determined to be established when the UE sends a radioBearerSetupComplete message for the CS domain.

5. The user equipment of claim 4, wherein the UE waits for a predetermined event to occur before the initiating if the UE does not have a pending data session request on the second network.

6. The user equipment of claim 4, wherein the UE waits for a predetermined event to occur before the initiating if the UE does not have a pending data transmission on the second network.

7. A method, at a network element, comprising:

receiving a request for Circuit Switched Fallback ('CSFB') from a user equipment ('UE'), the UE having a connection to a first network;

sending, to the UE, redirection information for transfer of the connection to a second network;

receiving a Routing Area Update ('RAU') message from the UE to initiate the transfer of the connection to the second network;

start a timer;

wait for a first of the CS voice radio bearers being established and the expiration of the timer;

initiating Packet Switched ('PS') signaling with the second network in response to the first of the CS voice radio bearers being established and the expiration of the timer;

wherein an initial value of the timer is configured based on a message from one of the first network and the second network; and wherein CS voice radio bearers are determined to be established when the UE sends a radioBearerSetupComplete message for the CS domain.

8. A network element, comprising:

a processor;

a communications subsystem;

wherein the processor and communications subsystem cooperate to:

send a request to a first network for Circuit Switched Fallback ('CSFB') while connected to the first network;

receive, responsive to the request, redirection information to a second network;

acquire the second network based on the redirection information;

start a timer;

wait for a first of the CS voice radio bearers being established and the expiration of the timer;

initiate Packet Switched ('PS') signaling with the second network in response to the first of the CS voice radio bearers being established and the expiration of the timer;

wherein an initial value of the timer is configured based on a message from one of the first network and the second network; and wherein CS voice radio bearers are determined to be established when the UE sends a radioBearerSetupComplete message for the CS domain.

* * * * *